(12) United States Patent
Byrne

(10) Patent No.: US 7,356,833 B2
(45) Date of Patent: Apr. 8, 2008

(54) SYSTEMS AND METHODS FOR AUTHENTICATING A USER TO A WEB SERVER

(75) Inventor: Barry A. Byrne, Wokingham (GB)

(73) Assignee: Computer Associates Think, Inc., Islandia, NY (US)

(*) Notice: Subject to any disclaimer, the term of this patent is extended or adjusted under 35 U.S.C. 154(b) by 821 days.

(21) Appl. No.: 10/640,228

(22) Filed: Aug. 13, 2003

(65) Prior Publication Data

US 2004/0193921 A1 Sep. 30, 2004

Related U.S. Application Data

(63) Continuation of application No. 10/313,406, filed on Dec. 6, 2002, now abandoned, which is a continuation of application No. 10/119,869, filed on Apr. 9, 2002, now abandoned, which is a continuation of application No. 09/921,138, filed on Aug. 3, 2001, now abandoned.

(60) Provisional application No. 60/222,941, filed on Aug. 4, 2000.

(51) Int. Cl.
*H04L 9/32* (2006.01)

(52) U.S. Cl. ............................................. 726/2; 726/3

(58) Field of Classification Search ................ 726/2–4, 726/27; 713/150, 168, 160–162
See application file for complete search history.

(56) References Cited

U.S. PATENT DOCUMENTS

| | | | |
|---|---|---|---|
| 5,586,260 A | 12/1996 | Hu | 395/200.2 |
| 5,604,490 A | 2/1997 | Blakley, III et al. | 340/825.31 |
| 5,655,077 A | 8/1997 | Jones et al. | 395/187.01 |
| 5,678,041 A | 10/1997 | Baker et al. | 395/609 |
| 5,682,478 A | 10/1997 | Watson et al. | 395/200.12 |
| 5,684,950 A | 11/1997 | Dare et al. | 395/187.01 |
| 5,684,957 A | 11/1997 | Kondo et al. | 395/200.06 |
| 5,689,638 A | 11/1997 | Sadovsky | 395/188.01 |
| 5,742,759 A | 4/1998 | Nessett et al. | 395/187.01 |
| 5,778,173 A * | 7/1998 | Apte | 726/2 |
| 6,006,333 A | 12/1999 | Nielsen | 713/202 |
| 6,205,480 B1 | 3/2001 | Broadhurst et al. | 709/225 |
| 7,124,173 B2 * | 10/2006 | Moriarty | 709/219 |

FOREIGN PATENT DOCUMENTS

WO  WO 00/52900  9/2000

OTHER PUBLICATIONS

J. Franks et al., "RFC 2069-An Extension to HTTP: Digest Access Authentication", Jan. 1997, [Online], Retrieved from the Internet <http://www.ietf.org/rfc/rfc2069.txt>, Retrieved on Nov. 21, 2002, XP-002221959, 17 pages.
Y. Zhao, "WebEntree: A Web Service Aggregator", *IBM Systems Journal*, vol. 37, No. 4, 1998, pp. 584-595.
International Search Report in International Application No. PCT/US01/24206, dated Dec. 3, 2002, 7 pages.

* cited by examiner

*Primary Examiner*—Hosuk Song
(74) *Attorney, Agent, or Firm*—Pillsbury Winthrop Shaw Pittman, LLP

(57) ABSTRACT

A method and system for automatically and transparently providing access to resources associated with a web server which requires authentication. A server is provided for a web browser, which intercepts and responds to authentication requests from web servers. The method and system allows a user to access multiple network resources with a single initial authentication procedure.

30 Claims, 2 Drawing Sheets

SYSTEMS AND METHODS FOR AUTHENTICATING A USER TO A WEB SERVER

This application is a continuation of U.S. application Ser. No. 10/313,406 filed Dec. 6, 2002 now abandoned by Barry A. Byrne and entitled "Systems and Methods for Authenticating a User to a Web Server" which is a continuation of U.S. application Ser. No. 10/119,869 filed Apr. 9, 2002 now abandoned by Barry A. Byrne and entitled "Systems and Methods for Authenticating a User to a Web Server, which is a continuation of U.S. application Ser. No. 09/921,138 filed Aug. 3, 2001, now abandoned by Barry A. Byrne and entitled "Systems and Methods for Authenticating a User to a Web Server" and claims benefit of U.S. Provisional Application Ser. No. 60/222,941 filed Aug. 4, 2000 and entitled "Web Server User Authentication Using Proxy Server".

BACKGROUND

1. Field

The present disclosure relates generally to networked computer systems. More particularly, the present disclosure relates to user authentication and access to one or more web servers.

2. Description of Related Art

In a typical web-based server application, access to information is achieved via a web server, with the application requiring the user to be authenticated by, e.g., a user id and/or a password. When a user requests access to information controlled by a web server, the web server typically has a login/authentication procedure which is independent of previous login/authentication procedures encountered by the user. To access the resources, appropriate authentication data must be presented to authenticate the user to the web server. This is conventionally accomplished by requiring the user to input additional login/authentication information specific to the new web server, or by hard-coding a generic login and password.

Both of these solutions are unsatisfactory. Requiring the user to input additional information for each access request places a burden on the user to remember multiple logins and passwords and may also be a potential security risk if passwords are transmitted unencrypted over the network. Using a generic or static login and password in a script is a potential security hole and does not readily provide different levels of access based on the identity of the user.

One attempt at addressing these issues is found in the new technology LAN manager (NTLM) automated authentication system. In the NTLM system similar components (the web browser and server) assure one another of the user's identity once the user is initially authenticated to a Microsoft network or to a Microsoft Windows NT domain (using a password). This assurance occurs transparently to the user. However, this system does not perform authentication to any web server that is not in the NT domain or in a trusted relationship with the original domain. Thus, the NTLM authentication system is of limited utility.

Other conventional systems also provide access to independent network resources without prompting the user for authentication data. When these systems receive a user request to access an independent network resource, system logon and server authentication data is autonomously supplied to the independent network resource without further user interaction. However, these systems are not concerned with a worldwide web hypertext transfer protocol environment, and are generally not concerned with authentication information based on the user's role. These systems maintain a password cache in the main memory of a local computer system. The password cache contains a server name, user name and password for each server to be accessed by a particular user. When presented with an access request, network software searches the password cache structure for the server authentication information before passing it on to the server to be accessed.

Other conventional systems restrict a user's access of Internet information based on a rating category and/or ID associated with a particular terminal through the implementation of a firewall internal to a user's computer network. The firewall prevents the user from accessing certain types of Internet information (e.g., prevents children from accessing obscene material, prevents workers from accessing non-work related material, etc.). These systems are concerned with an internal authorization to access remote resources (which are presumed to be public resources), and are not concerned with a system in which authentication information is required by remote servers.

FIG. 1 is a block diagram showing a conventional arrangement of network system 10 including a web server 12 in communication with a client 14. The client 14 executes a web browser 16 which provides a user interface (not shown) for accessing resources through the web server 12. The web server 12 requires user authentication data to allow access to its resources. The web browser 16 and web server 12 exchange communication signals in the HTTP format via communication link 18.

As is known in the art, servers have been used for data caching (retaining data when it is first fetched in case it is needed again), and as authentication servers for incoming traffic at a "firewall" (that is, conventional servers accept or reject user authentication). One example of a server is an advertisement filter which resides with the browser on the same computer, and which can remove advertisements from web pages.

SUMMARY

The exemplary systems and methods of this disclosure provide a server which is independent from other applications, such as a network server, and which automatically intercepts authentication requests from web servers which are intended for the browser. The server responds directly to the authentication requests by providing authentication data, such as the user's identity and password, transparently to the user. The server may interact with the web browser to request the authentication data, but preferably, locates the authentication data on the system incorporating the browser and/or server.

The authentication scheme according to the exemplary systems and methods of this disclosure allow a user to access numerous protected resources with a single authentication procedure, greatly improving the user's ease of system use. Further, because the server performs authentication on behalf of the user, the user can be authenticated to access protected resources using authentication methods that are not supported by the browser.

These and other features and advantages of this disclosure are described in or are apparent from the following detailed description of exemplary embodiments.

BRIEF DESCRIPTION OF THE DRAWINGS

Exemplary embodiments of the disclosure will be described in detail, with reference to the following figures wherein.

DETAILED DESCRIPTION

Figure 1:
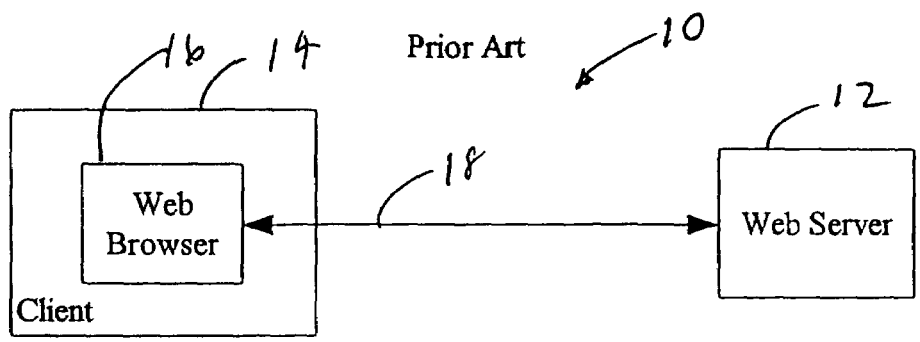
FIG. 1 is a block diagram of a conventional network including a web browser communicating with a remote web server.
Figure 2:
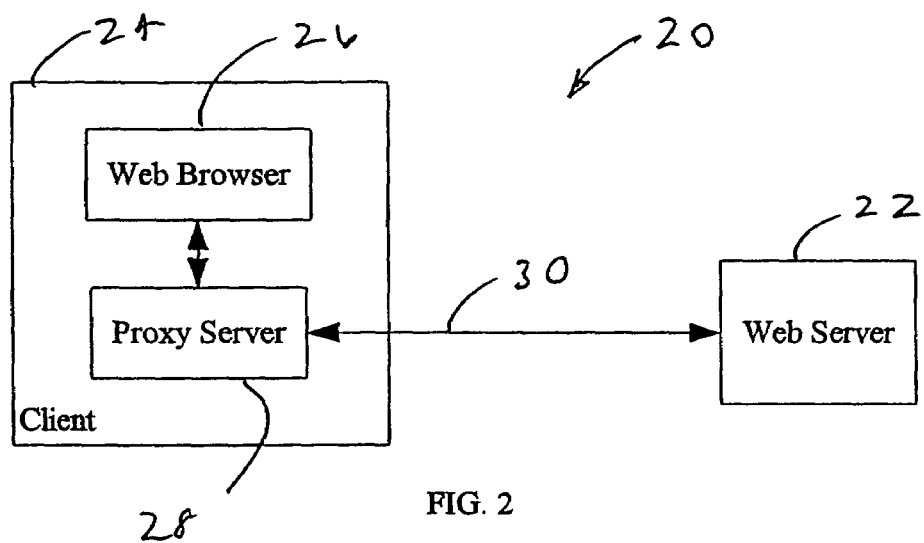
FIG. 2 is a block diagram of a network including a web server in communication with a first exemplary embodiment of the disclosure.

FIG. 2 is a block diagram showing a network 20 including a web server 22 in communication with an exemplary embodiment of a client 24 according to the present disclosure. The client 24 executes a web browser 26 and a server 28. The web browser 26 is in communication with the web server 22 via the server 28 through communication link 30.

The server 28 is a program that provides authentication service to the host device or other (client) programs, such as the web browser 26. The server 28 can run, waiting for requests to arrive, or the server 28 may be invoked by a higher level program or device (such as the web browser). Preferably, the server 28 is located on the same device as the web browser 26, so as to be able to readily access the user's credentials resident on the client 24. The server 28 is preferably implemented as an individual server for an individual browser and/or user.

In the exemplary embodiment of FIG. 2, the server 28 receives user authentication data from the browser or operating system resources or stored elsewhere, for example on the client 24, and automatically and transparently (to the user and/or browser) provides this data to the web server 22. It is to be understood that the authentication data may be stored anywhere which is accessible by the server 28. The server 28 intercepts all authentication requests encountered by the client device 24 when communicating with a web server 22. For each request, the server 28 determines whether it is configured to respond to the authentication request; that is, whether the server 28 has (e.g., stored within its own resources) or can obtain (e.g., from the web browser 26 or other resources on the client 24) sufficient authentication data to respond directly to the web server 22 requiring authentication. If the server 28 determines that it is configured to respond to the request, it conducts a hypertext transfer protocol (HTTP) authentication exchange (e.g., by saving the original HTTP request for authentication and introducing an authorization header with the user's credentials to the saved request) with the web server 22 automatically and transparently to the web browser 26. If the server 28 is not configured to respond to the request, the request is passed onto the web browser 26, which may instruct the user to input data to authenticate the user for access to the resources controlled by the web server 22. Should the user wish to access a second remote server (not shown), which may be associated with a second remote device or system (not shown), the server 28 is capable of intercepting any authentication requests originating from the second remote server, and will operate substantially as described above for responding to the first authentication request. It will be appreciated that the server 28 is able to determine which web server it is interacting with, to provide the correct data. Thus, an exemplary authentication method and system according to the present disclosure allows a user to be automatically and transparently authenticated to multiple servers with a single sign-on procedure.

While the first exemplary embodiment illustrated in FIG. 2, shows the web browser 26 and the server 28 collocated at the client 24, it is to be appreciated that the components of the client 24 may be located at distant portions of a distributed network, such as a local area network, a wide area network, an intranet and/or the Internet or the like. Thus, it is to be appreciated that the components of the client 24 may be combined into one device or collocated on a particular node of a distributed network. As will be appreciated from the following description, and for reasons of computational efficiency, the components of the client 24 may be arranged at any location within a distributed network without affecting operations of the system.

Additionally, while not shown in the figures, it is understood that the client 24 may also include one or more input devices such as a keyboard, a mouse, speech to text converter or the like, display devices such as a computer monitor, a display on a PDA or any other device capable of displaying information to one or more users, associated controllers and I/O interfaces and storage components.

As shown in FIG. 2, the client 24 may be implemented using a programmed general purpose computer. However, the client 24 can also be implemented using a special purpose computer, a programmed microprocessor or microcontroller and any necessary peripheral integrated circuit elements, an ASIC or other integrated circuit, a hardwired electronic or logic circuit such as a discrete element circuit, a programmable logic device such as a PLD, PLA, FPGA or PAL, or the like. In general, any device on which a finite state machine capable of implementing the flow chart of FIG. 3 can be used to implement the client 24.

While not expressly shown in the figures, the client includes memory which is preferably implemented using static or dynamic RAM. However, the memory can also be implemented using a floppy disk and disk drive, a writable optical disk and disk drive, a hard drive, flash memory or the like. Additionally, it should be appreciated that the memory can be either distinct portions of a single memory or physically distinct memories.

Further, it should be appreciated that the links 18, 30 and 50 can be wired or wireless network links. These networks can be local area networks, wide area networks, intranets the Internet or any other distributed processing and storage networks as long at the network uses HTTP or other Internet or distributed processing protocol.

Figure 3:
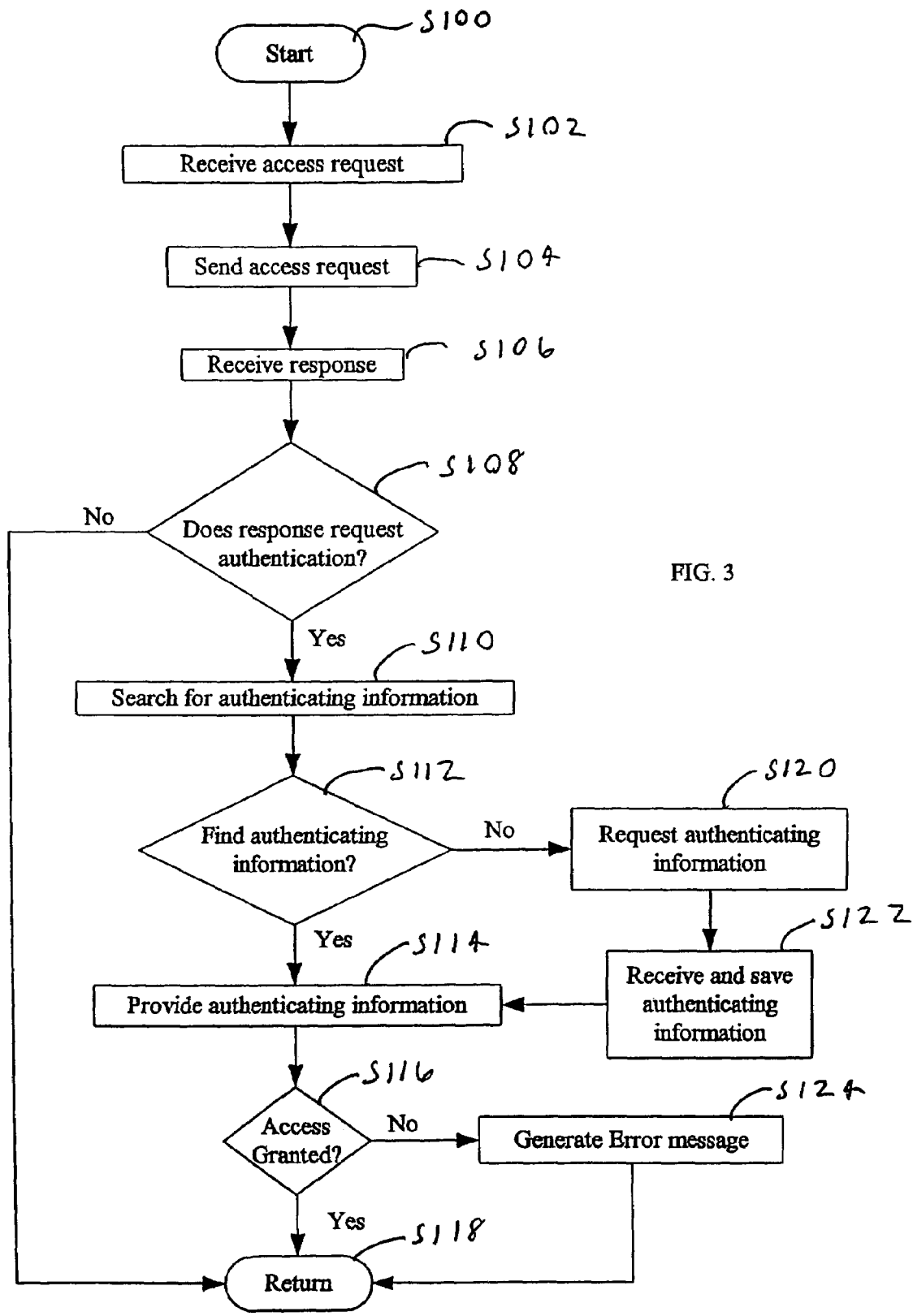
FIG. 3 is a flow chart outlining an exemplary method of accessing resources via a remote web server from a client in accordance with the disclosure.

FIG. 3 shows an exemplary control routine for providing access to resources controlled by a web server using a server in accordance with the present disclosure. The control routine may operate within another higher level control routine. Thus, while the control routine of FIG. 3 ends, it is understood that control may be returned to another higher level control routine after that control routine finishes.

Initially, it is assumed that a web browser has been loaded on the host device and that the web browser user has been logged in and initially authenticated to establish a user identity with the server. The control routine starts at step S100 and continues to step S102. In step S102, the control routine receives the access request from the web browser and continues to step S104. In step S104, the control routine sends the access request to the web server and continues to step S106. In step S106, the control routine receives the response from the web server and continues to step S108.

In step S108, the control routine determines whether the response requests authentication. If, in step S108, the control routine determines that the response does not request authentication, then the control routine jumps to step S118, where control returns to the control routine that invoked the control routine of FIG. 3. If, however, in step S108, the control routine determines that the response requires authentication, then the control routine continues to step S110. The request for authentication received in step S108, may be in the form of, e.g., one or more WWW-authenticate header(s) in the HTTP protocol, which permits the server to specify the type or types of authentication which can be accepted.

In step S110, the control routine searches the client for authenticating information and continues on to step S112. The authenticating information may be stored in a database directly associated with the server or anywhere else as long as it is available to the server. In step S112, the control routine determines whether the authenticating information has been found. If, in step S112, the control routine determines that the authenticating information has been found, then the control routine continues to step S114. If, however, in step S112, the control routine determines that the authenticating information was not found on the client, then the control routine continues to step S120. In step S120, the control routine requests authenticating information from the web browser and continues to step S122. If the request for authentication was provided as an authentication header in HTTP, then the server provides the browser a returned authorization header followed by an authentication token appropriate to the authentication method. In step S122, the control routine receives authenticating information from the web browser and continues to step S114.

In step S114, the control routine provides the authenticating information to the web server and continues to step S116. In step S116, the control routine determines whether access has been granted to the resources by the web server. If, in step S116, the control routine determines that access has been granted, then the control routine continues to step S118. In step S118, the control routine returns control to the control routine which called the control routine of FIG. 3. If, however, in step S116, the control routine determines that access has not been granted, then the control routine continues to step S124. In step S124, the control routine generates an error message and continues to step S118.

It will be appreciated that the principles of the present disclosure are readily adaptable to many types of authentication schemes. For example, rather than a general authentication scheme (access attempt, denial with request for authentication information, and new access attempt with authentication information), some types of authentication may require additional steps. One example of such an authentication protocol is a challenge-response authentication (such as the previously described NTLM technique), in which the remote web server denies an initial request for access and requests authentication, and also denies a further request for access including, e.g., a network identity, and issues a challenge. The party requesting access responds to the challenge, without transmitting a true authentication token (such as a password) over the network, by providing some indication that the requesting party knows a secret shared with the server. For example, this might involve the server returning the challenge in an encrypted form, where the method of encryption indicates the requesting party's knowledge of the shared secret. In other words, the requesting party responds by demonstrating that it knows the password without identifying the password. This exemplary embodiment of this disclosure can be implemented with this type of authentication scheme, by having the server intercept and respond on behalf of the browser. This aspect of the disclosure allows, for example, a user of a non-NTLM browser to authenticate itself to a NTLM server transparently to the user, and without modifications to the browser.

Figure 4:
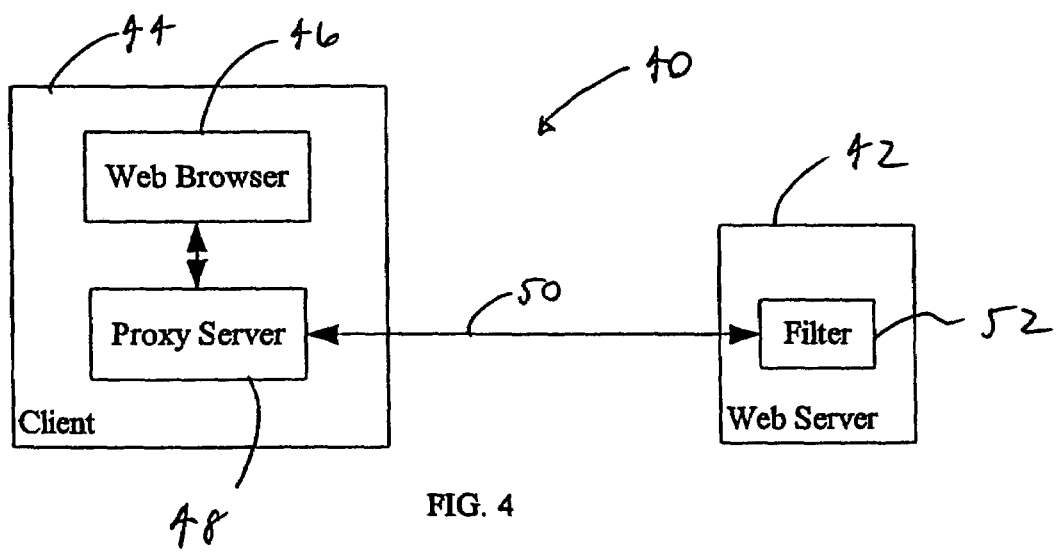
FIG. 4 is a block diagram of another network including a web server in communication with a second exemplary embodiment of the disclosure which allows a proprietary authentication scheme to be used to transfer both user identity and other credentials.

FIG. 4 shows a network 40 with another exemplary embodiment of the client 44 in accordance with the present disclosure which allows a proprietary authentication scheme to be used to transfer both user identity and other credentials such as the user's role to the web server 42. The web server 42 includes a filter 52 or other suitable plug-in which is in communication with the server 48. An example of such a filter is an ISAPI "filter" plug-in used by Microsoft. When the filter 52 detects an access denial by the web server 42, the filter 52 adds a header specifying the proprietary authentication scheme name to the set of headers sent back to the client 44 by the web server 42. As described above, the server 48 intercepts these headers on behalf of the web browser 46, and determines whether a proprietary authentication scheme is necessary to access the desired resources. If the proprietary authentication header is present, the server 48 responds to this header rather than the other authentication headers. To respond to the proprietary authentication header, the server 48 extracts the user's token/credential (which, according to one exemplary embodiment of the disclosure, includes at least the role and identity of the user), reformats the token for transmission in the HTTP protocol, and transmits the reformatted token to the web server 42 in an authorization header. The filter 52 then accepts the authorization header as authentication for the proprietary service, and also assigns the user a local web-server identity from a set of identities known to the server. The local identity can be unique or a duplicate identity shared by one or more other users.

Thus, it can be seen from the foregoing description that the authentication method and system of the present disclosure achieves numerous advantages. For example, the user can access multiple remote web servers without having to provide authentication information for each remote server access. Further, it should be appreciated that because the server performs authentication on behalf of the user, the user can be authenticated to access protected resources using types of authentication methods not known to the browser. Thus, the present disclosure allows the user to be authenticated to a web server using a protocol (e.g., Microsoft NTLM, or a proprietary authentication protocol) with a browser that does not support this protocol (e.g., Netscape Navigator). This advantage can be achieved without structural modifications to the browser. Numerous other advantages will be readily apparent to those of ordinary skill in the art.

While the above disclosure describes the operation of the server as one of "intercepting" the authentication request from the remote server, it is to be understood that the definition of the term "intercept" as used in this disclosure is intended to include other methods, such as filtering and monitoring the communications between the remote server and the browser. The only limitation to be placed upon the definition of the term "intercept" as used in this disclosure is such that enables the server to automatically respond to requests for authentication data from a remote server without passing such request along to the browser if the authentication data is available to the server without prompting for such information from the browser if possible. Additionally, the term is intended to include the function of receiving a request for authentication data from the remote server and passing and/or generating a request for authentication data along to the browser after the server has determined that the authentication data is not otherwise available.

While this disclosure has been described in conjunction with the specific embodiments outlined above, it is evident that many alternatives, modifications and variations are apparent to those skilled in the art. Accordingly, the preferred embodiments of the disclosure as set forth above are intended to be illustrative and not limiting. Various changes may be made without departing from the spirit and scope of the disclosure.

What is claimed is:

1. A method for providing browser access to network resources protected by a web server, the method comprising:
   intercepting a request for authentication data from a web server to a browser at a server located on the same device as the browser, the request for authentication having been sent in response to a request by the browser for access to resources protected by the web server;
   determining whether the device has the requested authentication data;
   providing the authentication data from the server to the web server if the device has the requested authentication data;
   requesting the authentication data from the browser if the device does not include the authentication data;
   receiving the authentication data from a user through a web browser interface;
   providing the authentication data from the web browser to the server; and
   providing the authentication data from the server to the web server.

2. The method of claim 1, wherein the server provides the authentication data by formatting a response according to a hypertext transfer protocol.

3. The method of claim 1, wherein the authentication data includes a role of a user of the browser.

4. The method of claim 3, wherein the authentication data further includes user identification information.

5. The method of claim 1, wherein the request for authentication data includes a hypertext transfer protocol authentication header.

6. The method of claim 5, wherein the step of providing the authentication data includes providing a hypertext transfer protocol authorization header.

7. The method of claim 1, wherein the request for authentication data includes a challenge to the request for access and wherein the providing of the authentication data in response to the challenge includes returning the challenge in an encrypted form, wherein the encrypted form indicates a shared secret.

8. The method of claim 7, wherein the web browser is a non-NTLM browser and the web server is a NTLM server.

9. A method for providing browser access to network resources protected by a web server, the method comprising:
   detecting an access denial issued by a web server in response to an access request by a browser to resources protected by the web server, the access denial including an authentication header;
   adding a supplemental authentication header to the authentication header;
   intercepting a request for authentication data from the web server to the browser at a server located on the same device as the browser, the request for authentication data being associated with the denial and including the supplemental authentication header;
   detecting the supplemental authentication header;
   determining whether the device has the requested authentication data; and
   responding to the supplemental authentication header by extracting the authentication data, and forwarding the authentication data to the web server in an authorization header.

10. A method for providing browser access to network resources protected by a web server, the method comprising:
    intercepting a request for authentication data from a web server to a browser at a server located on the same device as the browser, the request for authentication having been sent in response to a request by the browser for access to resources protected by the web server;
    determining whether the device has the requested authentication data;
    providing the authentication data from the server to the web server if the device has the requested authentication data;
    intercepting a request for authentication data from a second web server to the browser at the server, the second request for authentication data having been sent in response to a request by the browser for access to resources protected by the second web server;
    determining whether the device has the authentication data for the second web server; and
    providing the authentication data from the server to the second web server if the device has the requested authentication data.

11. A system for providing browser access to network resources protected by a web server, the system comprising:
    means for intercepting a request for authentication data from a web server to a browser at a server located on the same device as the browser, the request for authentication sent in response to a request for access by the browser to resources protected by the web server;
    means for determining whether the device has the requested authentication data;
    means for providing the authentication data from the server to the web server if the device has the requested authentication data;
    means for requesting the authentication data from the browser if the device does not include the authentication data;
    means for receiving the authentication data from a user through a web browser interface;
    means for providing the authentication data from the web browser to the server; and
    means for providing the authentication data from the server to the web server.

12. The system of claim 11, wherein the server provides the authentication data by formatting a response according to a hypertext transfer protocol.

13. The system of claim 11, wherein the authentication data includes a role of a user of the browser.

14. The system of claim 13, wherein the authentication data further includes user identification information.

15. The system of claim 11, wherein the request for authentication data includes a hypertext transfer protocol authentication header.

16. The system of claim 15, wherein the means for providing the authentication data includes means for providing a hypertext transfer protocol authorization header.

17. The system of claim 11, wherein the request for authentication data includes a challenge to the request for access and wherein the means for providing of the authentication data in response to the challenge includes means for returning the challenge in an encrypted form, wherein the encrypted form indicates a shared secret.

18. The system of claim 17, wherein the web browser is a non-NTLM browser and the web server is a NTLM server.

19. A system for providing browser access to network resources protected by a web server, the system comprising:
means for detecting an access denial issued by a web server in response to an access request by a browser to resources protected by the web server, the access denial including an authentication header;
means for adding a supplemental authentication header to the authentication header;
means for intercepting a request for authentication data from the web server to the browser at a server located on the same device as the browser, the request for authentication data being associated with the denial and including the supplemental authentication header;
means for detecting the supplemental authentication header;
means for determining whether the device has the requested authentication data; and
means for responding to the supplemental authentication header by extracting the authentication data, and forwarding the authentication data to the web server in an authorization header.

20. A system for providing browser access to network resources protected by a web server, the system comprising:
means for intercepting a request for authentication data from a web server to a browser at a server located on the same device as the browser, the request for authentication sent in response to a request for access by a browser to resources protected by the web server;
means for determining whether the device has the requested authentication data;
means for providing the authentication data from the server to the web server if the device has the requested authentication data;
means for requesting access by the browser to resources protected by a second web server;
means for intercepting a request for authentication data from the second web server to the browser at the server;
means for determining whether the device has the authentication data for the second web server; and
means for providing the authentication data from the server to the second web server if the device has the requested authentication data.

21. An information storage media comprising:
information that intercepts a request for authentication data from a web server to a browser at a server located on the same device as the browser, the request for authentication sent in response to a request for access by the browser to resources protected by the web server;
information that determines whether the requested authentication data is available; and
information that provides the authentication data from the server to the web server if the requested authentication data is available;
information that requests the authentication data from the browser if the device does not include the authentication data;
information that receives the authentication data from a user through a web browser interface;
information that provides the authentication data from the web browser to the server; and
information that provides the authentication data from the server to the web server.

22. The information storage media of claim 21, wherein the information which provides the authentication data further comprises information that formats a response according to a hypertext transfer protocol.

23. The information storage media of claim 21, wherein the authentication data includes a role of a user of the browser.

24. The information storage media of claim 23, wherein the authentication data further includes user identification information.

25. The information storage media of claim 21, wherein the request for authentication data includes a hypertext transfer protocol authentication header.

26. The information storage media of claim 25, wherein the information that provides the authentication data further comprises information that provides a hypertext transfer protocol authorization header.

27. The information storage media of claim 21, wherein the request for authentication data includes a challenge to the request for access and wherein the information that provides the authentication data in response to the challenge further includes information that returns the challenge in an encrypted form, wherein the encrypted form indicates a shared secret.

28. The information storage media of claim 27, wherein the web browser is a non-NTLM browser and the web server is a NTLM server.

29. An information storage media comprising:
information that detects an access denial issued by web server in response to an access request by a browser to resources protected by the web server, the access denial including an authentication header; information that adds a supplemental authentication header to the authentication header;
information that intercepts a request for authentication data from a web server to a browser at a server located on the same device as the browser, the request for authentication data being associated with the denial and including the supplemental authentication header;
information that detects the supplemental authentication header;
information that determines whether the requested authentication data is available; and
information that responds to the supplemental authentication header by extracting the authentication data, and forwards the authentication data to the web server in an authorization header.

30. An information storage media comprising:
information that intercepts a request for authentication data from a web server to a browser at a server located on the same device as the browser, the request for authentication sent in response to a request for access by the browser to resources protected by the web server;
information that determines whether the requested authentication data is available; and
information that provides the authentication data from the server to the web server if the requested authentication data is available;
information that requests access by the browser to resources protected by a second web server;

information that intercepts a request for authentication data from the second web server to the browser at the server;
information that determines whether the device has the authentication data for the second web server; and
information that provides the authentication data from the server to the second web server if the device has the requested authentication data.

* * * * *